United States Patent [19]
Eggert

[11] 3,877,748
[45] Apr. 15, 1975

[54] VEHICLE SAFETY SEAT

[75] Inventor: Walter S. Eggert, Huntingdon Valley, Pa.

[73] Assignee: The Budd Company, Troy, Mich.

[22] Filed: Feb. 4, 1974

[21] Appl. No.: 438,984

[52] U.S. Cl. ............... 297/216; 297/253; 297/386; 297/389
[51] Int. Cl. ............................................ A62b 35/00
[58] Field of Search ........... 297/253, 216, 390, 386, 297/379, 389; 188/1 C; 296/65 A; 292/128, 114; 248/424, 429, 430, 420, 422

[56] References Cited
UNITED STATES PATENTS

| | | | |
|---|---|---|---|
| 2,952,304 | 9/1960 | Pinkel | 297/216 |
| 2,952,490 | 9/1960 | Pfaff | 296/65 A |
| 3,266,830 | 8/1966 | Appleberry | 292/128 |
| 3,361,475 | 1/1968 | Villiers | 297/386 |
| 3,501,200 | 3/1970 | Ohta | 297/216 X |
| 3,545,808 | 12/1970 | Gescheiole | 297/216 |
| 3,627,379 | 12/1971 | Faust | 297/216 |

*Primary Examiner*—James T. McCall

[57] ABSTRACT

Vehicle safety seat of the general type disclosed in my patent application, Ser. No. 380,912, filed July 19, 1973, in which the occupant is secured by lap belt straps and shoulder straps; in which the seat back is mounted to tilt forward under impact loadings; in which the back includes improved yieldable energy-attenuation restraining means for collision impact loads; in which, when mounted to tilt on hinges, a latch provides a first holding mode or condition for normal use and a greater mode or condition for crash conditions; and in which a hinge means provides a first mode or condition for normal use and a greater mode or condition for crash conditions.

9 Claims, 6 Drawing Figures

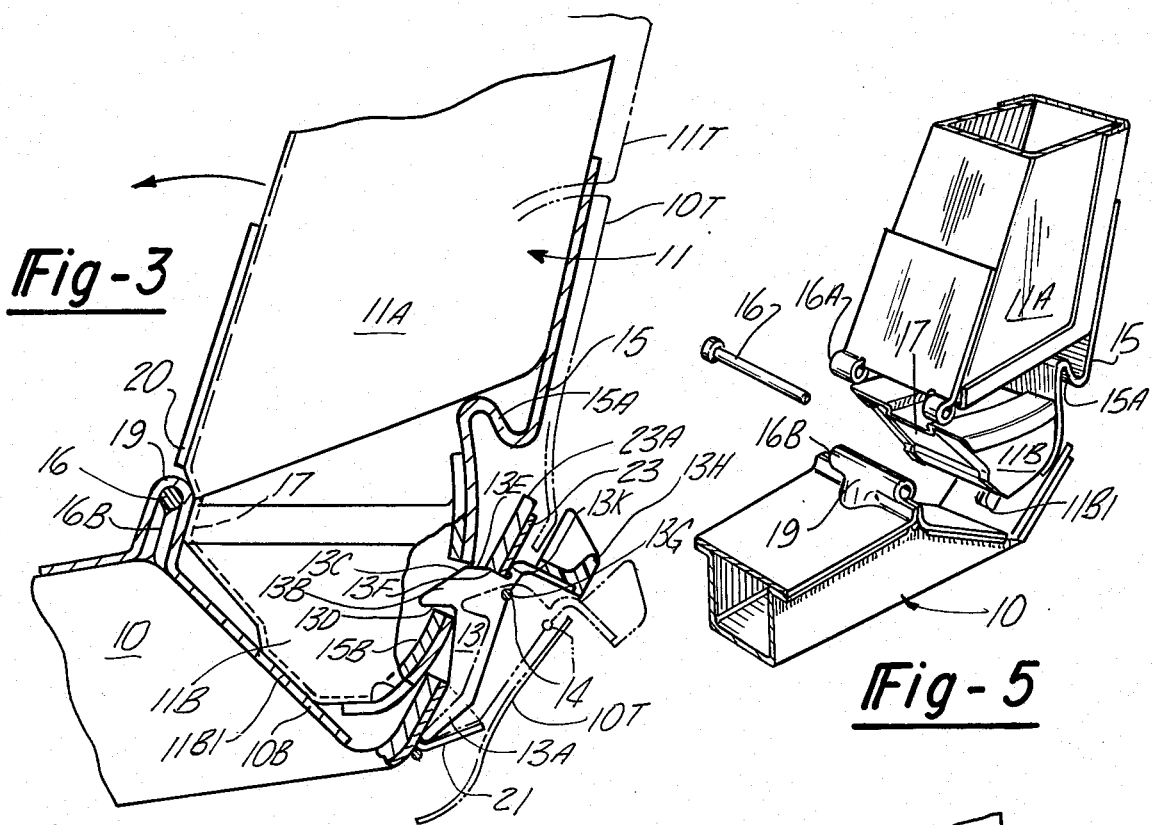
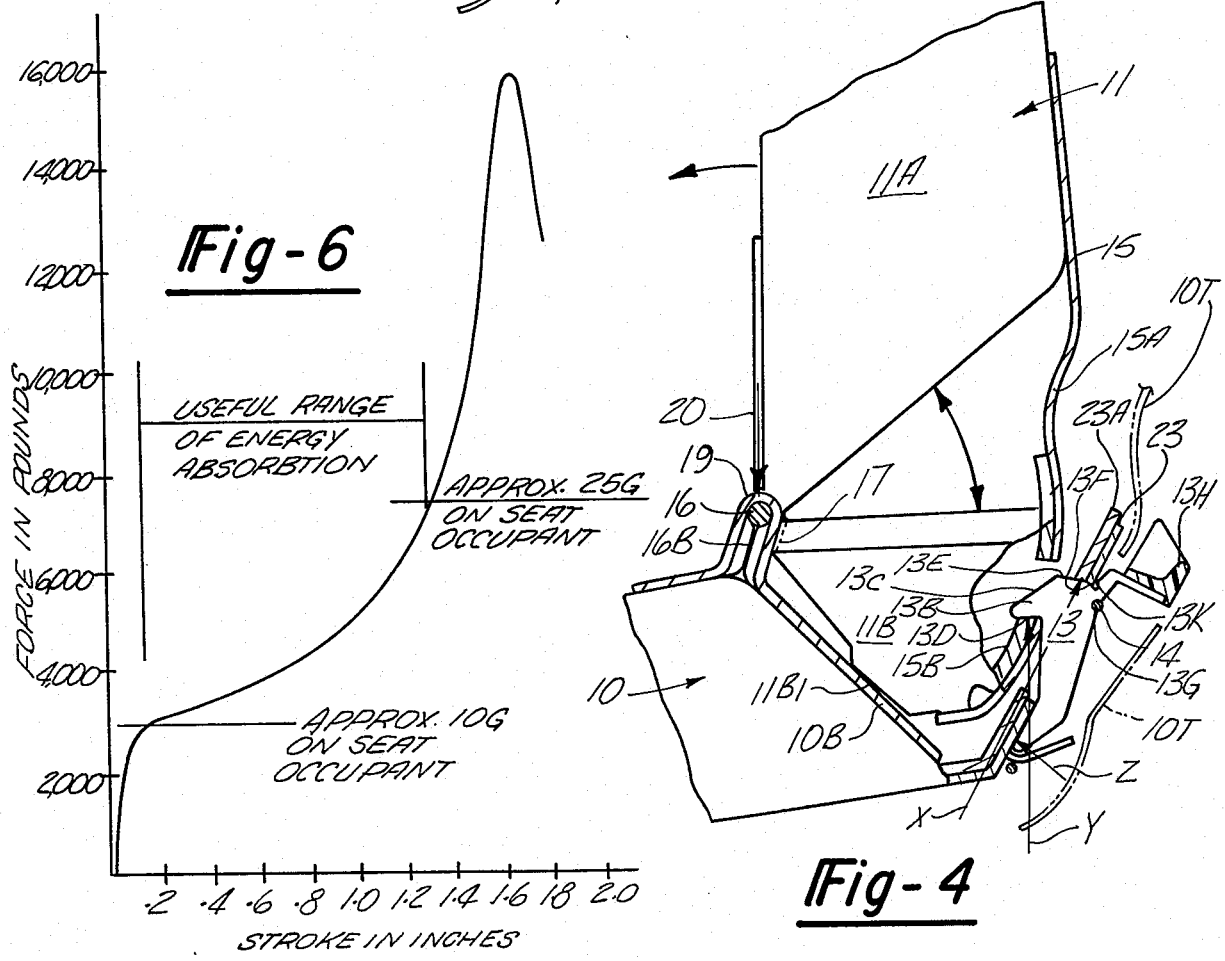

3,877,748

VEHICLE SAFETY SEAT

BACKGROUND

In seats which have backs mounted to tilt forward under collision impact conditions it is desirable to have improved energy-attenuation means which will provide longer movement than usual before reaching the extreme allowable tilted position and which will not break until loads far above usual crash loadings are reached.

In seats of the type having backs which fold forward on hinges for passenger convenience the hinges and latches are subject to failure under crash conditions. In my earlier application the back was provided with a yieldable energy-attenuating restraining element in the form of an outer corrugation in the rear panel of the seat back structure and had generally conventional hinge and latch means. Further study and experience have shown the desirability of improving the construction.

SUMMARY OF INVENTION

The present invention provides a yieldable energy-attenuating restraining device of improved design which eases the initial tilting movement of the seat back under collision impact loads and lengthens the forward tilting movement under extreme crash conditions without failure; provides a latch for the back which functions in a first mode under normal conditions and in a second mode to take greater loads under crash conditions; and provides back hinge means which functions in a first mode under normal conditions and in a second mode of greater load carrying capacity without dislocation of parts under crash conditions, part of auxiliary hinge means also serving as supplemental energy-attenuating means under crash conditions.

DRAWINGS

The objects of the invention, as well as certain features of novelty and advantages, will be apparent from the following description of an exemplary embodiment, reference being made to the accompanying drawings thereof, wherein:

FIG. 3 is an enlarged vertical longitudinal section taken about on the line 3—3 of FIG. 2;

FIG. 4 is a view like FIG. 3 but showing the position of parts after a crash;

FIG. 5 is an enlarged front perspective view, partly exploded, showing parts of interest;

FIG. 6 is a diagram showing the action of the improved energy-attenuating means.

SPECIFIC EMBODIMENT

In the embodiment shown herein the seat comprises a ledge, base or seat proper 10 and a back 11 hinged at 12 to swing forward from an upright position, as shown in FIG. 3, to an extreme forward crash position, as shown in FIG. 4. The seat may be mounted on the floor for energy-attenuating restrained movement, as in my prior application, but no specific floor mounting means is shown or considered herein. There is a mere indication of floor supports at 10A.

Figure 1:
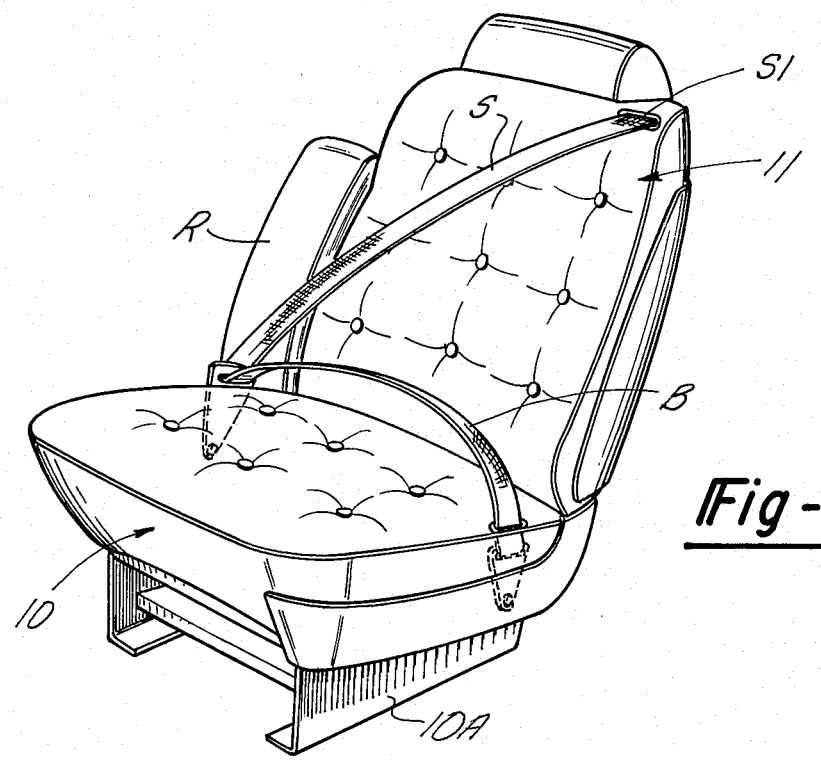
FIG. 1 is a front and side perspective view of a seat embodying the invention.

A foldable arm rest R, a shoulder strap S and a belt strap B are shown in FIG. 1. The main crash load on the seat back comes from the top anchor S1 of the shoulder strap so the restraint means shown herein is located on the same side as the shoulder strap anchorage.

Figure 2:
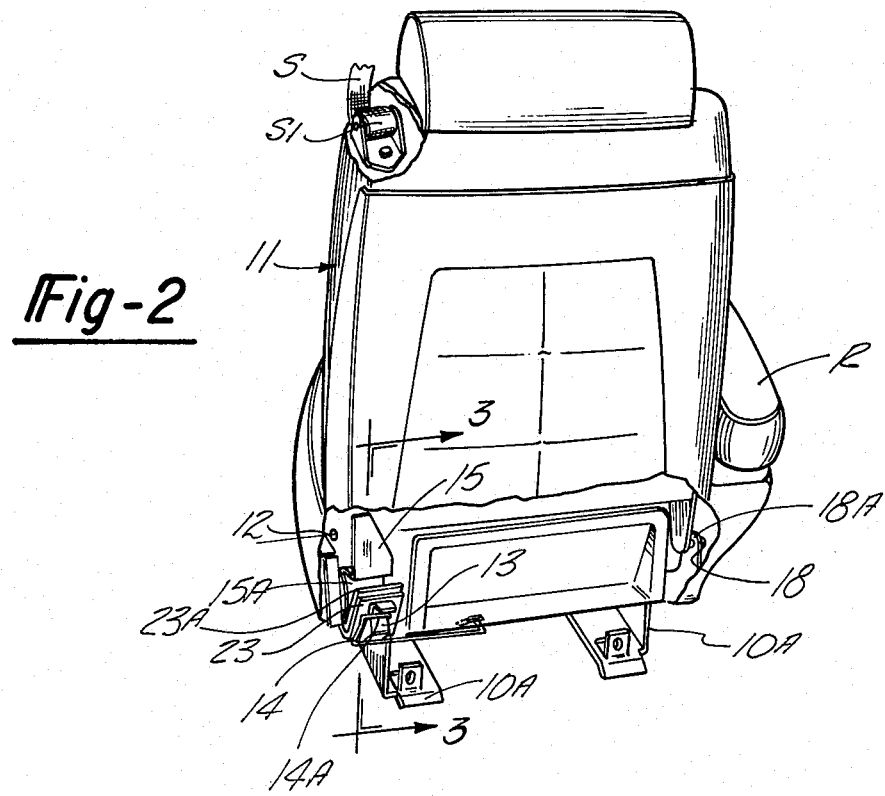
FIG. 2 is a rear elevation, partly broken away to show parts beneath the finish cover trim.

A latch 13, FIG. 2, is mounted on the ledge or base portion 10 of the seat; whereas in the prior application the latch was mounted on the tiltable back. This latch is of a special form and is associated with specially designed parts, as will be described later herein. It is urged into engaging position by a torsion-type spring 14.

In the prior application the energy-attenuating restraint element was a simple external corrugation formed in the rear panel of the back; herein a double-curved energy-attenuating restraint element 15A of a general S-shape is formed in a special strip member 15 located on the shoulder strap anchorage side of the seat. This location is above the latch. The special formation and location of the energy-attenuating restraint element provides an easier initial movement and a more resistant and longer subsequent movement of the seat back under impact conditions.

It would be difficult to form a double-curved or S-shaped bend in a rear panel sheet of a seat back but it can readily be provided in a supplemental attached strip as hereby provided.

At the other side of the back a simple heavy pin 18 is provided which can be slid into a socket of a hinge member 18A on the base by sidewise movement of the back on the base.

On the same side having the latch and energy-attenuating restraining element a hinge pin 16 for normal tilting action is provided. It is made of yieldable material, such as ductile soft steel, which will yield under crash conditions. As shown in FIG. 5, the hinge pin 16 is carried by an apertured hinge butt member 16A on the back and a hinge pin butt member 16B on the seat base. The front panel of the back at the hinge is provided with a curved downwardly extending projection 17 which engages behind a relatively heavy loop member 19 carried by the seat base at the hinge pin location to take abnormal loads under crash conditions after the hinge pin yields to a predetermined extent. The front panel of the back, under crash conditions, tends to move forwardly and downwardly and the bottom forwardly facing open curve of the downward projection 17 provides secure engagement behind the loop portion of the member 19 under these conditions, independently of the normal hinge means. To firmly halt the downward movement the front panel of the back is provided with a heavy plate member 20 which engages with the top of the loop of member 17 under crash conditions.

The rear panel of the upper back portion 11A extends forward at the bottom to a point near the hinge line and there connects with means, here including the projection 17, connecting with the forward top portion of the lower back portion 11B. The connection is bendable and constitutes what is called a "plastic" hinge. The projection 17 thus serves in bending and provides control of the geometry while the energy absorber functions.

The lower portion 11B of the back has a bottom seating portion 11B1 which rests on a support plate 10B of the seat base, this plate here being an extension of the loop member 19.

The latch 13 has no fixed pivot pin but has a tail 13A which is disposed within a pocket member 21 with permissible fore and aft swinging movement. The latch has a keeper 13B which is located in an opening of a mounting plate 23 and its reinforcing plate 23A and when the seat back is in its rearward upright position the front end of the keeper enters an opening in the strip 15 and its reinforcing plate 15B. The keeper on the top has a camming surface 13C which allows the seat back to be snapped down into secured position; and on the bottom has a hook-shaped surface 13D which securely retains the back in its rearward upright use position. In upright position the seat back leans backward sufficiently to provide clearance to permit the latch to be opened or closed with minimum friction at the surfaces 13D and 13F.

At the top of the keeper the cam surface 13D is followed by a second short cam surface 13E to provide entry into the opening of the mounting plate 23, 23A. Behind the second cam surface 13E there is a straight holding surface 13F which engages the top surface of the opening in the plates 23, 23A.

In effect, the latch 13, having no fixed pivot pin, floats and swings in its retaining pocket so as to have enough vertical movement to allow its keeper to enter adjacent openings freely. Under crash conditions, when the energy-attenuating element 15A is pulled out, as shown in FIG. 4, the load all comes in shear on the latch keeper, which is a solid piece of material and able to take any loads which may develop. There is no pin to take loads as in the usual latch constructions.

Under crash loadings the latch acts as a self-locking unit, FIG. 4, force on the upper portion 13F acting along line X, force on the lower portion 13D acting along line Y, and force on the tail 13A acting along the line Z.

The spring 14 has an upper transverse portion 14A which fits in a notch 13G of the latch, permitting ready assembly and removal of the latch. The spring also is so formed as to allow the necessary vertical adjusting movement of the latch. The latch has a handle 13H by which it may be operated. The handle includes an upstanding portion 13K which lies behind the strip 23 which prevents the separation of parts under heavy loads and limits the inward movement of the keeper at all times.

In case of a crash the double-bent or S-shaped energy-attenuating restraint element 15A provides relatively soft initial action which increases in strength until the final stop stage is reached for the crash condition. The curve of FIG. 6 shows the action of this energy-attenuating restraint element. It is to be noted that the restraint action is very extensive due to the double-bent S-shaped form of the restraint element.

The S-shaped energy-attenuating restraint element 15A, though shown herein on a pin-hinged latch-held seat back, can be advantageously used on a seat back of the bench seat type which has a front panel portion which bends as a plastic hinge, like the member 17 described above, to allow the back to tilt forward under crash conditions, the S-shaped energy-attenuating restraint element in the back panel part controlling the crash tilting movement in the same way as for a pin-hinged seat back.

At some stage in the crash reaction the pin 16 will yield and when it yields enough the bent tail projection 17 and the plate member 20, acting against the loop member 19, will take any loads which may be imposed in the hinge region without failure and without appreciable shifting between parts, this auxiliary hinging action being independent of the normal pin action. By this arrangement the normal hinge is left for easy action for normal back tilting movements. The normal loads are carried by the hinge pin in shear; when the auxiliary hinge elements come into action there is extensive surface contact and this with stronger parts so that there is no chance of failure at the hinge location.

Since the curved projection 17 is connected between the upper part 11A and the lower part 11B of the back it is bent into greater curvature upon crash loading thereby increasing its effectiveness for holding the parts in proper position. It also serves in bending as an auxiliary energy-attenuating element for assisting the primary energy-attenuating restraint element 15A.

For clarity, the seat cover or trim has been omitted in the detail figures but the trim line 11T for the back and 10T for the base are shown in broken lines.

The diagram, FIG. 6, is largely explanatory from the notations thereon. It is to be taken as merely exemplary and not limiting as to the particular loads and movements given. It will be seen that there is elastic yield up to about 10 g. on the seat occupant; then a gradual plastic elongation up to about 25 g., and then further extensive plastic elongation beyond the useful range up to the point of failure at about 16,000 pounds load.

It is thus seen that the invention provides an improved safety seat construction in which a more effective energy-attenuating element furnishes more extensive forward seat back movement under crash conditions and which can be readily assembled in the seat structure; in which an improved hinge means furnishes easy movement under normal conditions and auxiliary hinge support means which functions under crash conditions; and in which an improved latch construction furnishes easy latching under normal conditions and unusually strong holding effect under crash conditions.

While one embodiment of the invention has been described for purposes of illustration, it is to be understood that there may be various embodiments and modifications within the general scope of the invention.

I claim:

1. A vehicle safety seat comprising in combination, a seat base, a seat back, pin hinge means providing normal forward tilting movement of the seat back on the seat base, and a latch for holding the back in its rearward use position, said hinge means including a hinge pin adapted to yield under crash conditions, and adjacent supplemental hinge means at the hinge location which engages to hold the parts closely in hinging position, independently of the pin hinge means, and take the crash loading after the hinge pin has yielded by a predetermined amount, said supplemental hinge means including a curved projection on the seat back and a coacting member on the seat base to take hinge loads as applied by the seat back when having an occupant strapped therein under crash conditions.

2. A vehicle safety seat for carrying an occupant comprising in combination, a seat base, a seat back, a shoulder strap having its top end connected to said back seat, pin hinge means providing normal forward tilting movement of the seat back on the seat base, and a latch for holding the back in its rearward use position, said hinge means including a hinge pin adapted to yield under crash conditions, and adjacent supplemental hinge means at the hinge location which engages to hold the parts closely in hinging position, said supplemental hinge means being disposed on the side of said seat back of which said shoulder strap is connected independently of the pin hinge means to take the crash loading after the hinge pin has yielded by a predetermined amount.

3. A vehicle safety seat as set forth in claim 2, in which said second hinge pin is insertable in the pin holder by lateral movement of the seat back into a position to insert the yieldable hinge pin on the other side.

4. A vehicle safety seat as set forth in claim 1, in which said curved projection forms a connection between an upper seat back part and a lower seat back part, the back parts moving apart under crash loadings and the curved projection connection being bent during such separation.

5. A vehicle safety seat, comprising in combination, a seat base, a seat back, hinge means providing normal tilting movement of the seat back on the seat base, and a latch for holding the back in its rearward use position on the base, said latch being mounted for limited vertical floating movement and having a keeper for engaging upper and lower hole surfaces of adjacent apertured base and back parts to place shear in the keeper portion of the latch when the adjacent apertured parts are subjected to separating forces and thereby providing a locking geometry to prevent separation.

6. A vehicle safety seat as set forth in claim 5, wherein said latch is provided with a tail element carried in a pocket member of a part on which it is mounted and having a swingable movement in said pocket member.

7. A vehicle safety seat as set forth in claim 6, in which there is further included a spring for urging said latch into engaging position and which provides the required floating movement of the latch to engage its keeper in the holes of the apertured members.

8. A vehicle safety seat as set forth in claim 5, which further includes an energy-attenuating restraint element of double curvature carried on one side of the latch, and in which said latch is free-floating and has a keeper engaged in shear in adjacent apertured overlying members of the base and back.

9. A vehicle safety seat as set forth in claim 8, in which said energy-attenuating restraint element is carried by an outboard strip part and carries therebelow a lower inboard strip part having the aperture thereof engaged by the latch and the latch having a lower hook surface engaging a hole in said lower strip part and having a backing element lying behind the base part on which it is mounted to hold the base and back parts together closely for imposing shear on said keeper as crash loads develop.

* * * * *